R. E. THOMPSON.
INDICATING MECHANISM.
APPLICATION FILED JAN. 19, 1914.

1,225,527.

Patented May 8, 1917.
2 SHEETS—SHEET 2.

Witnesses:
E. C. Murphy.
L. B. Weymouth.

Inventor:
Ralph E. Thompson.
By Henry J. Miller
atty.

UNITED STATES PATENT OFFICE.

RALPH E. THOMPSON, OF BROOKLINE, MASSACHUSETTS.

INDICATING MECHANISM.

1,225,527.   Specification of Letters Patent.   Patented May 8, 1917.

Application filed January 19, 1914. Serial No. 813,109.

*To all whom it may concern:*

Be it known that I, RALPH E. THOMPSON, a citizen of the United States, residing at Brookline, in the county of Norfolk and State of Massachusetts, have invented certain new and useful Improvements in Indicating Mechanisms, of which the following is a specification, reference being had to the accompanying drawings, forming part thereof.

This invention has reference to an improved mechanism for indicating the efficiency of a gaseous fuel as used in a combustion engine through comparison of the rate of fuel consumption with the speed of the mechanism operated by the engine.

The object of this invention is to provide means whereby the operations of a series of mechanisms may be correlated and such correlation presented to the vision in terms of a known standard of efficiency.

Another object of this invention is to so construct an indicator and its operating mechanism that a pair of relatively movable indicator elements may coöperate with a third indicator or scale element to indicate both the efficiency of the driven mechanism and the rate of fuel consumption.

Another object of the invention is to so construct a rotary dial adapted to be operated through the flow of fluid and an indicator adapted to be operated relative to the work performed by such fluid that both of said devices may coöperate with an exponent of the work performed whereby relative efficiency of the particular fluid may be observed as expressed in terms of the work performed or in the rate of speed.

Another object of the invention is to so combine a speed indicator with a fuel consumption indicator that the indication of speed may be projected for comparison with the fuel consumption indicator.

Other objects of the invention will appear from the following description.

The invention consists in the pair of independently movable indicators related to the stationary scale and in the mechanism for operating said indicators.

The invention also consists in such other novel features of construction and combination of parts as shall hereinafter be more fully described and pointed out in the claims.

Similar characters of reference designate corresponding parts throughout.

Figure 1:
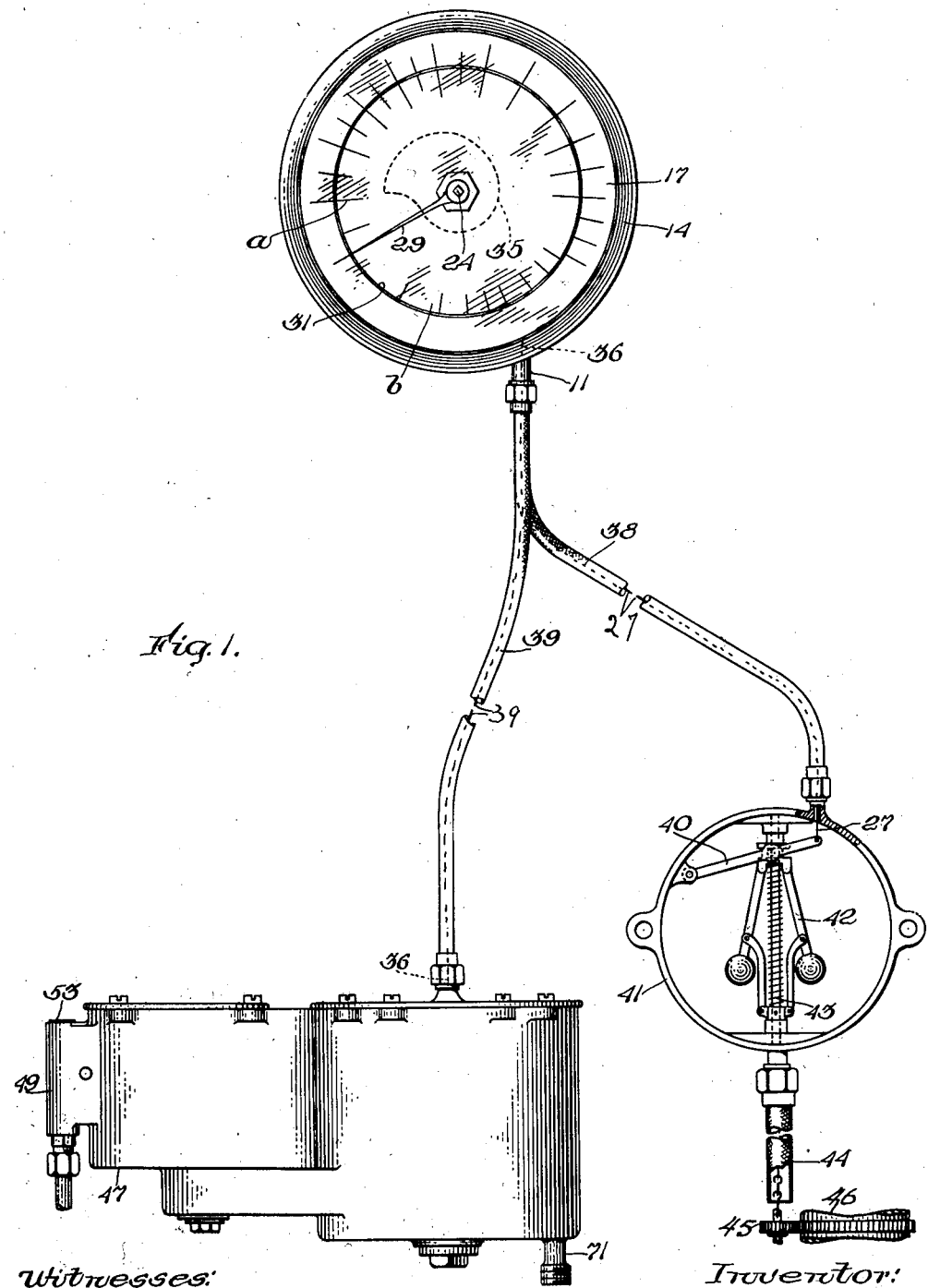
Figure 1, represents a front elevation of the improved efficiency indicator illustrating an embodiment of the invention adapted to be applied to a combustion engine and more particularly to an automobile having such an engine, parts of the mechanism being broken away.
Figures 2, 3:
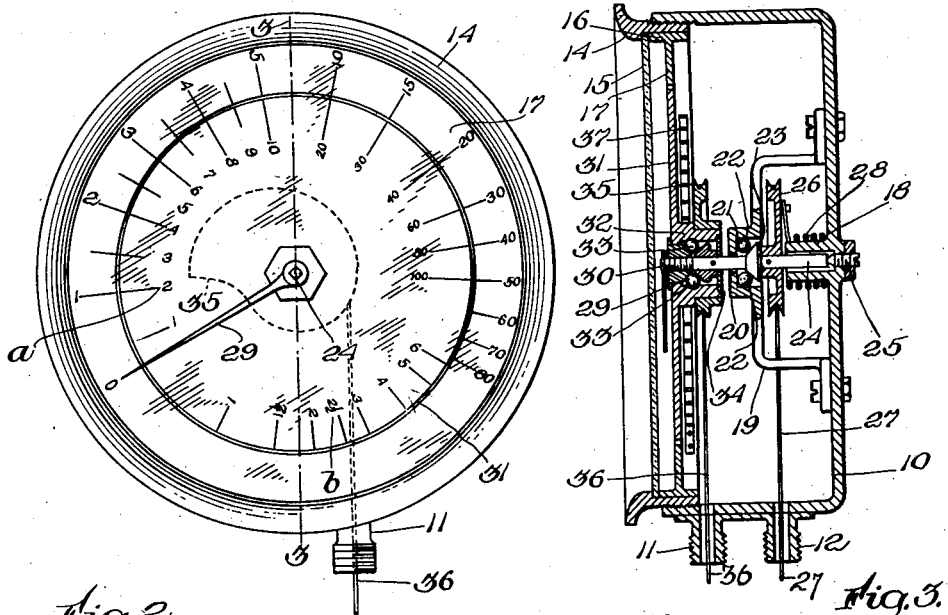
Fig. 2, represents a front view of the indicating device.
Fig. 3, represents a vertical sectional view as taken on line 3—3 Fig. 2.

While this invention is applicable to any fluid operated mechanism having a moving part and in which the operating fluid or a constituent of such fluid is adapted to be automatically controlled the embodiment of the invention shown and described herein is particularly applicable to an automobile having an internal combustion engine adapted to be operated through the combustion of a gas of which one of the elements or constituents is gasolene or other somewhat similar fluid.

In the operation of a combustion engine the gaseous fuel, initially a fluid, is generally supplied to a carbureter in which said fluid is combined with air to thereby form a gaseous mixture the efficiency of which as a fuel in the engine depends to a considerable degree on the proportions of its constituent elements and various manually operated means have been used to adjust the supply of gasolene. This adjustment of the supply of gasolene to the carbureter has heretofore depended mainly upon the intuition of the operator or upon the appearance of undue color or odor of the products of combustion passing from the discharge pipe of the engine. In so far as I am informed there has heretofore been no method or mechanism employed whereby the efficiency of the mixture supplied to the engine could be compared in terms with the work actually performed by such mixture as indicated by the speed attained by such mechanism.

In carrying this invention into practice in its preferred form I provide the casing 10 having the bushings 11 and 12 which may be positioned at any convenient point for observation as the dashboard of an automobile or on any convenient fixed member. In the front of this casing 10 is screwed or secured the rim 14 carrying the glass 15 and the annular scale member 16 having the annular scale plate 17 graduated in suitable progression and having numerals relating to miles per hour.

Extending inward from back of the casing 10 is the tubular post 18 which is axially positioned relative to the scale plate 17. Secured to the back of the casing 10 is the frame 19 having the opening 20 which is in registry with the bore of said post 18 and which is embraced by the ball way 21 having the bearing balls 22, 22 to receive the cone 23 of the indicator shaft 24 the end of which is engaged by the adjustable bearing screw pin 25 mounted in a perforation of the casing back and extending into the post 18. Shaft 24 is provided with the cam 26 the periphery of which is projected in a suitable curve and is grooved to receive the flexible wire or cable 27 which has one end fixed to said cam 26 and extends through bushing 12 so that the initial drawing action of said cable is on the smaller diameter of said cam 26 while the rotation of said cam, and of course its shaft 24, is resisted by the coil spring 28 carried by said post 18 and engaging a fixed pin or member extending from said cam. The outer end of said shaft 24 is supplied with the indicator needle 29 which, preferably, is of a length to extend over the graduations on the scale plate 17.

Adjacent the outer end of shaft 24 is the cone 30 and rotatable on said shaft in registry with the scale plate 17 is the dial 31 having the ballway 32 carrying the balls 33, 33 which are held in bearing with cone 30 by the plate 34 mounted on said ballway 32 and bearing against the back of said cone. On the ballway 32 is mounted the cam 35 which, in the present instance, is similar in shape and size to the cam 26 and has the flexible wire or cable 36 which extends through bushing 11 and against the drawing action of which the rotation of cam 35 is resisted by the coil spring 37 acting against a member in fixed relation to said cam 35. Dial 31 has two series of graduations $a$ and $b$ both series of which have numerals arbitrarily related to gallons per hour or other quantities. The graduations of scale $b$ preferably indicate units of measurements and fractions of said units, but this scale $b$ may be dispensed with if desired.

Flexible tubes 38 and 39 are connected respectively with the bushings 11 and 12 and through these tubes the cables 27 and 36 respectively extend to independently operating devices for effecting drawing action on said cables under certain conditions of which it is desired to keep informed, and it is apparent that the independent action of said operating devices will be indicated by the needle 29 on the scale or graduations of plate 17 as well as on the scale $a$ of dial 31, that is the indication of the needle 29 on one of said scales will be projected or indicated to the other of said scales and a relative reading of said scales is always present.

Needle 29 and its actuating means including the cable 27 preferably relate to the work actually accomplished or to the speed of the driven mechanism and, for the present purpose, said cable 27 is connected with the pivoted lever 40 contained within the governor casing 41 adapted to be mounted in any convenient location on the automobile body or chassis and having the rotary governor 42, of any well known construction having the rotary shaft 43 which is extended by the flexible shaft 44 having the pinion 45 adapted to be rotated by the gear 46 which is adapted to be attached to some rotary part of the machine. It is of course evident however that any other suitable and well known governor mechanism may be substituted for that shown.

Figure 4:
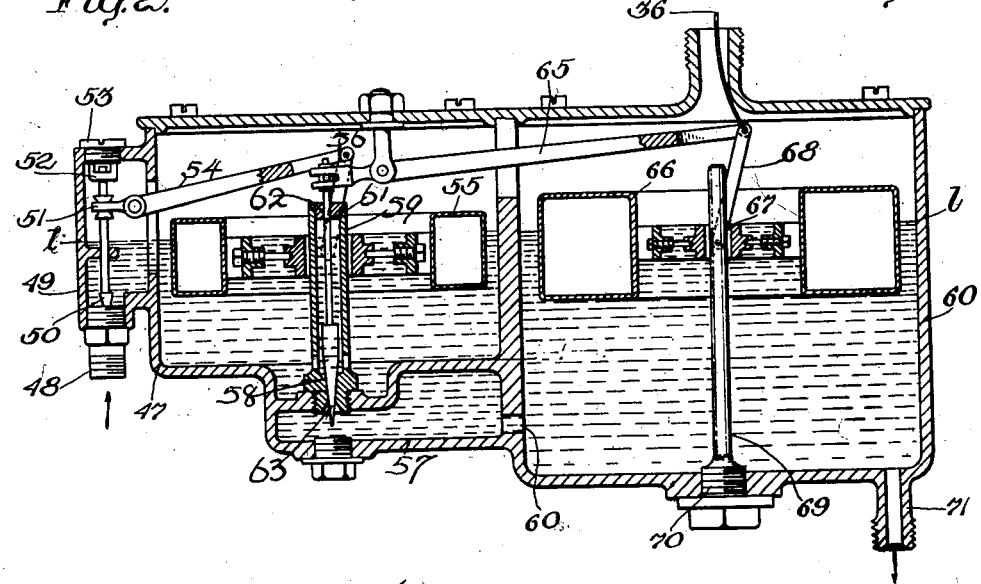
Fig. 4, represents a vertical sectional view of the fuel tanks and the means for controlling the flow of fuel gas therethrough.

Dial 31 and its actuating means including the cable 36 relate, in this instance, to the mechanism actuated by the flow of the gasolene to the intake of the carbureter. This mechanism, in its preferred form, is illustrated in Fig. 4 of the drawings and comprises, for convenience of manufacture, a single casing having the compartments 47 and 60. Compartment 47 has the inlet or supply pipe 48, adapted to be connected with any gasolene supply, and communicating with the inlet chamber 49 which in turn communicates with said compartment 47, the inflow of gasolene from pipe 48 being controlled by the needle valve 50 having its stem 51 slidably engaged with the guide 52 of the screw plug 53 secured in an opening of the chamber 49. The opening and closing movement of said valve 50 is effected by the lever 54 which is pivotally mounted in chamber 49 and extends through the opening in the wall of said compartment 47 and, in said compartment 47, is provided with the float 55 to which it is connected by link 56.

At its lower portion compartment 47 has the receptacle 57 communicating with chamber 60 and having in its lower wall an opening closed by a screw plug while in an opening in its upper wall is secured the valve seat 58 having the upwardly extending tubular guide 59 for float 55, furnished with perforations adjacent its lower end and having at its upper end the guide 61 in which is slidable the stem 62 of needle valve 63 which latter coöperates with the valve seat 58 to control the flow of gasolene to receptacle 56 and hence to chamber 60. Movement of said valve 63 is effected by the short end 64 of the pivoted lever 65 which end 64 is operatively engaged with a member of the stem 62 of said valve 63 while the long end of said lever 65 extends through an opening in the wall of chamber 60 and within said chamber 60 is connected to cable 36. Provision is made to operate said lever 65 with the rise and fall of the gasolene in said compartment 60 such provision comprising the float 66 which has the slide member 67 connected by the rigid pivoted link 68 with the free end of lever 65 and slidable on the guide 69 forming part of the screw plug 70 secured through an opening in the bottom wall of said compartment 60, and this bottom wall of said compartment 60 has the outlet 71 which is adapted to be connected with the intake pipe of any well known carbureter or similar mechanism or device in which the gasolene may be supplied to air.

With the compartments 47 and 60 supplied with gasolene to level indicated at 1—1 it will be seen that if a quantity of said gasolene passes out of compartment 60, through outlet 71, the level of gasolene in said compartment will be lowered and the float 66 will move downward. Such movement of float 66 will be transmitted through link 68 to lever 65 and from said lever to the valve stem 62, to effect the proportionate opening movement of valve 63, and to cable 36 to draw said cable and thus rotatively actuate dial 31 by means of its cam 35 whereby the degree of movement of said float 66 or the increased supply of gasolene passing to the carbureter will be indicated by rotation of the dial 31 relative to the needle 29 and can readily be compared with the speed of the motor as indicated by said needle on the graduations of the scale plate 17. The area of valve seat 58 and of outlet 71 is preferably equal so that when the outflow from compartment 60 equals the inflow through said valve seat 58 the fluctuation of float 66 practically ceases and the dial 31 is held by its cable 36 practically stationary with respect to needle 29 and scale plate 17.

By observation of the relative positions of dial 31 and needle 29 with respect to each other and to the graduations of scale plate 17 the operator is informed as to the speed of the machine and to the rate at which the gasolene is being used to attain such speed. If the result of such comparison is not satisfactory the operator can readily change the proportions of gasolene and air passing through the carbureter by the operation of mechanism which is well known and is not herein shown as it forms no part of the present invention.

It is of course evident that as the gasolene passes from the compartment 57 through valve seat 58 the level of gasolene in compartment 47 will be lowered and float 55 will operate valve 50 to the open position to admit a further supply through inlet 48.

While the embodiment of my invention shown herein discloses a simple and efficient means for correlating the operations of independent mechanisms or the efficiency of a series of operations it is not my intention thereby to limit the use of my invention to the correlation of any particular number of operations. I am also aware that the means whereby the correlation of the operations is or may be presented to the vision may be changed considerably from that shown herein as regards their association, coöperation and construction. Nor is it necessary for all purposes that all of the indicators be contained in one case or that the movable indicators have similar paths of movement.

The means for operating the several indicating members may vary considerably from that shown herein and it is of course evident that this improved indicating apparatus in one or more of its embodiments may be useful in correlating the operations of any group of mechanisms.

Having thus described my invention I claim as new and desire to secure by Letters Patent—

1. An indicator comprising a standard scale, a dial rotatably mounted and having a retracting spring, means for rotating said dial against the action of said spring, a spring retracted rotary shaft extending through said dial and having a needle extending over the face of said dial and said scale, and means for effecting rotation of said shaft, the movement of said dial and said needle being correlated with said scale.

2. An indicator comprising a spring retracted dial, a spring retracted shaft having a needle extending over the face of said dial, said shaft and said dial having cams, cables for effecting the rotation of said cams, and disassociated mechanisms adapted to operate said cables.

3. An indicator comprising a casing having an annular scale member, a spring retracted shaft rotatably mounted axially of said scale and having a needle, a cam on said shaft, a dial rotatably mounted on said shaft and having a retracting spring and a cam, cables coöperating on said cams, speed actuated means for actuating one of said cables, and fluid flow measuring means for operating the other of said cables.

4. In an indicator for a motor, the combination with a fuel supply for said motor, a gage, a pair of indicating members mounted to move relatively to each other and to said gage, a connecting mechanism for one of said indicating members adapted to be operated by said motor in relation to the output of said motor, and means adapted to be influenced with relation to the flow of fuel through said supply and having a connection adapted to actuate the other of said indicating devices.

5. An indicator comprising indicating elements of which two are movable and a third relatively fixed, one said movable indicating element operated by a valve in a fuel-measuring device, another said movable indicating element adapted for operation by movement of the machine, the said indicating elements so adapted that the indication of one movable indicating element may be correlated with the indication of the other movable indicating element.

6. An indicator comprising indicating elements of which two are movable and a third relatively fixed, one said movable indicating element operated by a fuel-measuring device, another said movable indicating element having means adapted for operation by the movement of a governor operatively connected with the machine, the said indicating elements so adapted that the indication of one movable indicating element may be correlated with the indication of the other movable indicating element.

7. An indicator comprising indicating elements of which two are movable and a third relatively fixed, one said movable indicating element operated by a valve in a fuel-measuring device operating between a fuel consumption chamber and another chamber in which the pressure at the level of the valve is fixed relative to the pressure from the supply tank; another said movable indicating element having means adapted for operation by movement of the machine, the said indicating elements so adapted that the indication of one movable indicating element may be correlated with the indication of the other movable indicating element.

8. An indicator comprising indicating elements of which two are movable and a third relatively fixed, one said movable indicating element operated by a valve in a fuel-measuring device, another said movable indicating element having means adapted for operation by the movement of a governor operatively connected with the machine, the said indicating elements so adapted that the indication of one movable indicating element may be correlated with the indication of the other movable indicating element.

9. An indicator comprising indicating elements of which two are movable and a third relatively fixed, one said movable indicating element operated by a valve in a fuel-measuring device operating between a fuel-consumption chamber and another chamber in which the pressure at the level of the valve is relative to the pressure from the supply tank; another said movable indicating element having means adapted for operation by the movement of a governor operatively connected with the machine, the said indicating elements so adapted that the indication of one movable indicating element may be correlated with the indication of the other movable indicating element.

RALPH E. THOMPSON.

Witnesses:
R. LANGDON MACKAY,
GEORGE C. ARVEDSON.